(12) United States Patent
Ebrahimi et al.

(10) Patent No.: US 12,493,002 B2
(45) Date of Patent: Dec. 9, 2025

(54) METHOD FOR DISTINGUISHING BETWEEN THE PRESENCE OF A FOREIGN BODY OR A GAS BUBBLE IN A MEDIUM, AND CORRESPONDING SYSTEM

(71) Applicant: Endress+Hauser Flowtec AG, Reinach (CH)

(72) Inventors: Mohammad Sadegh Ebrahimi, Lörrach (DE); Dietmar Frühauf, Lörrach (DE); Volker Frey, Schopfheim (DE); Raphael Kuhnen, Schliengen (DE); Wolfgang Drahm, Freising (DE); Stefan Pflüger, Munich (DE); Anne Habermehl, Erding (DE); Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 152 days.

(21) Appl. No.: 18/698,446

(22) PCT Filed: Sep. 22, 2022

(86) PCT No.: PCT/EP2022/076335
§ 371 (c)(1),
(2) Date: Apr. 4, 2024

(87) PCT Pub. No.: WO2023/057218
PCT Pub. Date: Apr. 13, 2023

(65) Prior Publication Data
US 2024/0426770 A1  Dec. 26, 2024

(30) Foreign Application Priority Data
Oct. 8, 2021 (DE) .................. 10 2021 126 221.6

(51) Int. Cl.
*G01N 22/00* (2006.01)

(52) U.S. Cl.
CPC .................................. *G01N 22/00* (2013.01)

(58) Field of Classification Search
CPC ....................................................... G01N 22/00
See application file for complete search history.

(56) References Cited

U.S. PATENT DOCUMENTS 6,456,093 B1  9/2002  Merkel et al.
6,577,700 B1  6/2003  Fan et al.

FOREIGN PATENT DOCUMENTS

CN        212556772       *  2/2021  ............. B64C 27/08
DE        10022022 C2    11/2001
(Continued)

*Primary Examiner* — Alesa Allgood
(74) *Attorney, Agent, or Firm* — Mark A. Logan; Endress+Hauser (USA) Holding, Inc.

(57) ABSTRACT

A method for distinguishing between the presence of a foreign body and a gas bubble in a flowable medium in a pipeline or a container includes evaluating received microwave signals, wherein mechanical vibrations are introduced into the medium by means of which a gas bubble present in the medium is set into vibration. A gas bubble is detected only in the event that when mechanical vibrations are introduced and the received microwave signals or the value derived therefrom is/are modulated; otherwise, a foreign body is detected. Also disclosed is a system which is suitable for carrying out the method according to the present disclosure.

8 Claims, 2 Drawing Sheets

(56) References Cited

FOREIGN PATENT DOCUMENTS

| | | | |
|---|---|---|---|
| DE | 20313089 U1 | 1/2004 | |
| DE | 102004063229 A1 | 7/2006 | |
| DE | 102007052047 A1 | 5/2009 | |
| DE | 102016116072 A1 | 3/2018 | |
| EP | 1327876 B1 | 12/2003 | |
| JP | 2021006781 A | 1/2021 | |
| WO | 9116087 A1 | 10/1991 | |
| WO | WO-2018051865 A1 * | 3/2018 | ............. H04R 17/10 |
| WO | 2021181328 A1 | 9/2021 | |

* cited by examiner

METHOD FOR DISTINGUISHING BETWEEN THE PRESENCE OF A FOREIGN BODY OR A GAS BUBBLE IN A MEDIUM, AND CORRESPONDING SYSTEM

CROSS-REFERENCE TO RELATED APPLICATIONS

The present application is related to and claims the priority benefit of DPMA Patent Application No. 10 2021 126 221.6, filed on Oct. 8, 2021 and International Patent Application No. PCT/EP2022/076335, filed on Sep. 22, 2022, the entire contents of which are incorporated herein by reference.

TECHNICAL FIELD

The invention relates to a method for distinguishing between the presence of a foreign body or a gas bubble in a medium and to a corresponding system.

BACKGROUND

In the process industry, flowable media are conveyed in pipelines. In industries with particularly high hygienic requirements, e.g., the food processing industry, it is desirable to detect foreign bodies as early and reliably as possible, i.e., for example, before or during filling into a container. The term, foreign body, includes all solid materials that are in principle undesirable in the medium for safety and/or quality assurance reasons. These include, for example, glass shards, fish bones, bone fragments, plastic and rubber pieces, gravel/stones, etc., as well as unwanted solid pieces in an otherwise liquid to viscous-pulpy medium.

EP 18 53 900 A1 describes a system and a method for detecting the presence of foreign bodies in a medium. There, both microwaves and ultrasonic waves are transmitted as transmission signals into the medium from a corresponding transmitter unit configured for this purpose. The occurrence of changes in the medium, especially the presence of a foreign body, is determined on the basis of an evaluation of received signals. However, the solution presented in EP 18 53 900 A1 provides no way to distinguish a foreign body from a gas bubble. In contrast to foreign bodies, gas bubbles represent a harmless change in the medium.

SUMMARY

The object of the invention is therefore to provide a way to distinguish between the presence of a foreign body or a gas bubble in the medium. This is particularly challenging in the event that the gas bubble and the foreign body are in principle the same size.

The object is achieved by a method for distinguishing between the presence of a foreign body or a gas bubble and a system for distinguishing between the presence of a foreign body or a gas bubble in a flowable medium.

With regard to the method, the object is achieved by a method for distinguishing between the presence of a foreign body or a gas bubble in a flowable medium in a pipeline or a container, comprising the steps of:
transmitting transmitted microwave signals into the medium,
introducing mechanical vibrations into the medium,
receiving received microwave signals that have passed through the medium,
evaluating the received microwave signals, wherein the presence of an object, viz., a gas bubble or a foreign body, in the medium is detected by means of the received microwave signals or a value derived therefrom,
wherein a gas bubble present in the medium is set into vibration by means of the mechanical vibrations, and a modulation of the received microwave signals or of the value derived therefrom is generated by the vibrating gas bubble,
detecting a gas bubble only in the event that, when mechanical vibrations are introduced, the received microwave signals or the value derived therefrom is/are modulated, and
otherwise, detecting a foreign body.

The introduction of the mechanical vibrations sets the gas bubble into mechanical vibration. The received microwave signal (for example, its time curve) is thereby modulated. By evaluating, for example, a time curve of the received microwave signal, it is determined whether the received microwave signal is modulated by the mechanical excitation. This is only the case in a gas bubble. On the other hand, a solid foreign body is essentially not set into vibration by the mechanical vibrations introduced, or at least not to the extent that it would modulate received microwave signals and/or the value derived therefrom. By evaluating, for example, a time curve of the received microwave signal and/or a time curve of the value derived from the received microwave signal, it can be seen on the one hand whether an object, i.e., a foreign body or a gas bubble, is indeed present in the medium. On the other hand, based upon the presence or absence of the modulation, it is possible to detect whether the object is a gas bubble or a foreign body.

A way is therefore provided to distinguish between gas bubbles and foreign bodies, thus reliably excluding false positives when detecting the presence of a foreign body in the medium.

In a preferred embodiment of the method, the method comprises the following steps, which are carried out before the step of introducing the mechanical vibrations into the medium:
transmitting transmitted microwave signals into the medium,
receiving received microwave signals that have passed through the medium,
evaluating the received microwave signals, wherein the presence of the object is detected by means of the received microwave signals or a value derived therefrom.

In this embodiment, it is thus first determined in a preceding step whether an object is indeed present in the medium by evaluating the received microwave signals. This initially without the excitation of mechanical vibrations. Only then, in the second step according to the invention, is it determined whether the object is a foreign body or a gas bubble by means of the mechanical vibrations introduced into the medium.

In one embodiment of the invention, the value derived from the received microwave signals is the permittivity of the medium. The permittivity is also referred to in the prior art as dielectric conductivity or dielectric constant. The presence of the object is thus, for example, first determined by evaluating a time curve of the permittivity of the medium. If the permittivity is modulated by setting the object into mechanical vibration, the object is a vibrating gas bubble. Alternatively, other typical values that can be derived from the received microwave signals, including, for example, a propagation delay, attenuation, phase shift, etc., are of course also suitable. Optionally, the permittivity itself can also be determined from these values.

In one embodiment of the invention, the step of evaluating the received microwave signals and detecting the presence of the object in the medium also comprises determining a size of the object. Based upon the time curve of the permittivity, for example, a size of the object (including of course a certain range of fluctuation) can be estimated.

In a further development of the last-mentioned embodiment, an excitation frequency of the introduced mechanical vibrations is selected as a function of the determined size of the object.

In a further development of the above embodiment, a resonance frequency is determined at least on the basis of the size of the object, at which resonance frequency the gas bubbles are set into resonant vibrations, and wherein the resonance frequency is selected as the excitation frequency.

In this further development, the gas bubbles are thus set into resonant mechanical vibration. The "determination of the resonance frequency at least on the basis of the size" comprises determining a preliminary value of the resonance frequency based upon the size with a range of fluctuation, i.e., within a determined frequency band. The frequency band is then traversed, e.g., by a frequency sweep, to determine the resonance frequency for excitation in resonance, and/or the actual resonance frequency is set only by a feedback control loop.

In one embodiment of the method, the mechanical vibrations are introduced into the medium by introducing ultrasonic waves. For this purpose, a corresponding system that is designed to carry out the method according to the invention comprises a correspondingly designed ultrasonic transmitter unit.

With regard to the system for distinguishing between the presence of a foreign body or a gas bubble in a flowable medium, the object is achieved by a system for distinguishing between the presence of a foreign body or a gas bubble in a flowable medium in a pipeline or a container, wherein the system is designed to carry out the method according to the invention, comprising:

at least one microwave transmitter unit, which is designed to transmit transmitted microwave signals into the medium, at least one microwave receiver unit, which is designed to receive received microwave signals that have passed through the medium, an ultrasonic transmitter unit, which is designed to introduce ultrasonic waves into the medium, and a control/evaluation unit, which is configured to distinguish between the presence of a foreign body or a gas bubble in the medium on the basis of the evaluation of the received microwave signals.

The microwave transmitter unit and the microwave receiver unit can also be designed as a single, combined transceiver unit. The control/evaluation unit for evaluating the received microwave signals can also be designed, as mentioned above, to control the vibrations of the gas bubbles to a resonant vibration. Alternatively, a further control/evaluation unit can also be provided for controlling the vibrations of the gas bubbles in resonance.

BRIEF DESCRIPTION OF THE DRAWINGS

The invention will be explained further with reference to the figures, which are not true-to-scale, wherein the same reference signs designate the same features. For reasons of clarity, or if it appears sensible for other reasons, previously noted reference signs will not be repeated in the following figures.

In the figures.

DETAILED DESCRIPTION

Figure 1:
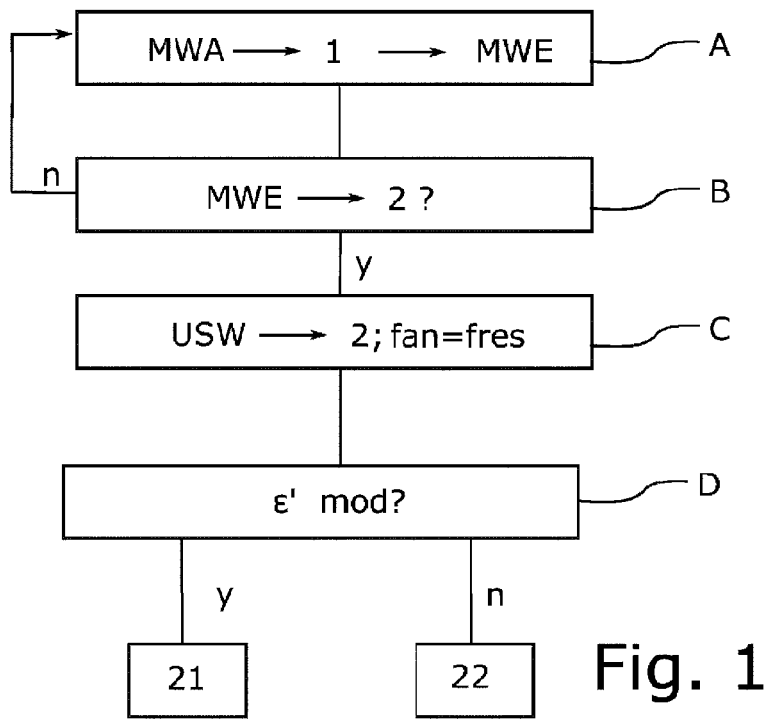
FIG. 1 shows a flowchart of the method according to the present disclosure in a preferred embodiment of the method according to the present disclosure.

In FIG. 1, in an embodiment of the method according to the invention, transmitted microwave signals MWA are transmitted into the medium 1 in a first step A). In a preferred embodiment, this is done first without simultaneous transmission of ultrasonic waves USW, i.e., without the simultaneous excitation of mechanical vibrations of gas bubbles 21 optionally present in the medium 1 by means of the ultrasonic waves USW.

The microwave frequency range is in particular between 3 MHz to 10 GHz, preferably between 1 GHz and 3 GHz.

Then, in a step B), received microwave signals MWE are received and processed by a control/evaluation unit 5. Based upon the received microwave signals MWE, it is first determined whether an object 2 is indeed present in the medium 1. If this is the case—see dash "y" after step B)—then step C) is carried out. If not—see dash "n" after step B)—step A) is repeated in order to monitor again a later appearance of an object 2 in the optionally flowing medium 1.

Figure 2A:
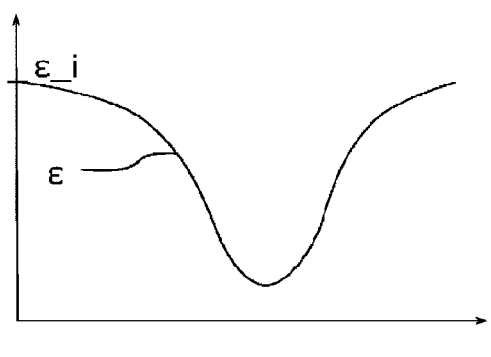
FIG. 2a, 2b, 2c show schematic views of a time curve of the permittivity for different cases.

The appearance of the object 2 can be determined based upon a value that can be derived from the received microwave signals MWE—for example, from a time curve of the permittivity epsilon. This is indicated in FIG. 2a by a solid line. Here, the permittivity epsilon is shown as a function of time. For this purpose, the permittivity epsilon is determined, for example, as a location-dependent function and converted to a time-dependent function based upon a known and/or determined flow rate of the medium 1. In order to determine the flow rate, the system, independently of the corresponding embodiment, can also comprise a flow meter designed for this purpose (not shown here). Of course, it is also possible to analyze a location-dependent function directly. The time curve of the permittivity epsilon is stored, for example, in a memory unit that is associated with or at least connected to the control/evaluation unit 5.

As a result of the appearance of the object 2 in the medium 1, the permittivity epsilon decreases in an inverted peak in the time curve to a local minimum (see FIG. 2a), starting from an initial permittivity epsilon_i of the medium 1, in order to then increase again to the initial permittivity epsilon_i. In the case of a substantially water-based medium 1, said water-based medium has—for example, without an object—a permittivity epsilon_i of approx. 80, whereas a foreign body 22 (depending upon the material it is made of) typically has a permittivity epsilon in the range of 2 to 8. This is in similar ranges to the permittivity epsilon of a gas bubble 21, as a result of which it is not always possible to distinguish between a gas bubble 21 and a foreign body 22 solely by observing the time curve of the permittivity epsilon without further measures.

The method according to the invention solves this in a (here, subsequent) step C) from FIG. 1 by introducing mechanical vibrations into the medium 1 by transmitting (and possibly also receiving) ultrasonic waves USW.

Figure 3:
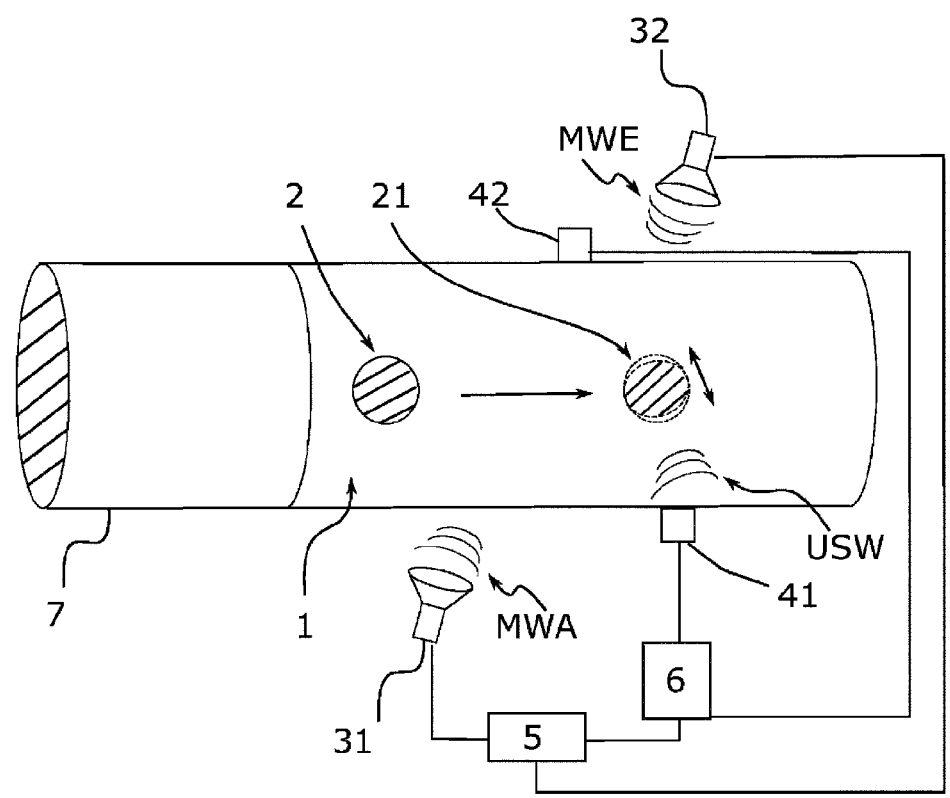
FIG. 3 shows a schematic view of an embodiment of a system according to the present disclosure.

In the event that the object 2 is a gas bubble 21, it is set into mechanical vibration by the ultrasonic waves USW. The vibrating gas bubble 21 in a pipeline 7 is shown in more detail in FIG. 3, which is explained below.

The excitation in step C) by means of the ultrasonic waves USW preferably takes place in resonance, wherein the resonance frequency fres is roughly determined as the excitation frequency fan first on the basis of the size of the object 2. In this case, the size of the object 2 can be determined or estimated beforehand. For example, the length of the object 2 (i.e., extension of the object 2 along an anticipated direction of flow) can be seen from the width of the inverted peak in FIG. 2a, and the width (i.e., extension of the object 2 along an intended direction of flow) can be seen from the height of the inverted peak in FIG. 2a. Optionally, the size of the object 2 can alternatively also be estimated in advance—for example, based upon a preselection of the user based upon the knowledge of typical sizes of the object 2 in the corresponding medium 1.

An attempt is then made to set the object 2 into resonant vibration by means of a feedback control loop. If the object 2 is not a gas bubble 21, excitation in resonance is, optionally, not possible at all. In this case, the control can, for example, move to a stop, and the first control/evaluation unit 5 can optionally generate the message, "excitation in resonance not possible."

In this case, "mechanical resonance" means that the gas bubble 21 itself performs resonant, mechanical vibrations (for example, periodic compression of the gas bubble 21). For this purpose, the ultrasonic waves USW themselves may be in resonance, but do not necessarily have to be, the latter being the case, for example, with excitation by a pulsed ultrasonic wave.

In a step D), the permittivity epsilon' is then again detected and recorded by transmitted microwave signals MWA and received microwave signals MWE, this time with simultaneous excitation by ultrasonic waves USW.

Figure 2B:
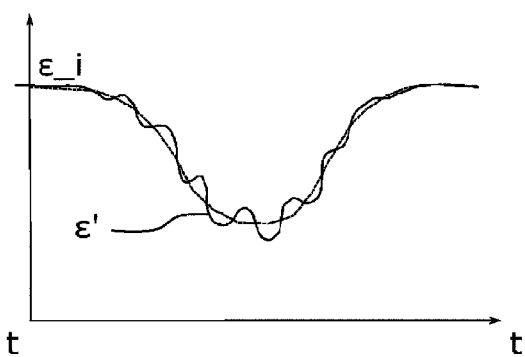

The time curve of the permittivity epsilon' with excitation using ultrasonic waves USW is shown in FIG. 2b, wherein the solid line shows the case of a gas bubble 21. This is similar to the curve already shown in FIG. 2a, except that there is also a modulation of the permittivity epsilon' due to the vibration of the gas bubble 21, in this case around a line drawn as a dashed auxiliary line. On the other hand, in the case of a foreign body 22, the time curve of the permittivity epsilon' would also substantially correspond to the curve shown in FIG. 2a, i.e., have no modulation, even with excitation using ultrasonic waves USW. This is because the foreign body 22 cannot be set into mechanical vibration to the same extent as the gas bubble 21. The time curve of the permittivity epsilon' with excitation using ultrasonic waves USW is therefore analyzed to see whether or not there is a modulation of the permittivity epsilon'.

In this case, the time curve of the permittivity epsilon without excitation can be created with the same microwave transmitter unit 31 and microwave receiver unit 32 as the time curve of the permittivity epsilon' with excitation. If necessary, two separate microwave transmitter units 31, 33 and microwave receiver units 32, 34 can also be provided (not shown in FIG. 3). Regardless of the embodiment, however, it should be ensured that the same object 2 is detected by means of the entire system; this depends upon the respective inertia of the measuring system or the measuring speed and the maximum permissible flow rate.

The presence of a gas bubble 21 is verified on the basis of the analysis of the time curve in FIG. 2b. Only in the event that the object 2 is actually a gas bubble 21 is the permittivity epsilon modulated. For improved verification of the presence of the modulation, a bandpass filter, for example, is placed on the time curve from FIG. 2b, wherein the known excitation frequency fan of the ultrasonic waves USW is preferably selected as the frequency of the bandpass filter.

Figure 2C:
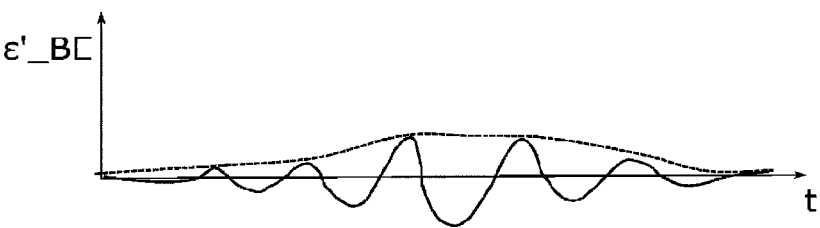

The time curve using the bandpass filter epsilon'_BP is shown in more detail in FIG. 2c. For this purpose, a dashed auxiliary line is shown as an envelope. For example, on the basis of a limit value for the envelope, which is in particular stored in the control/evaluation unit 5, it is determined whether or not there is a sufficiently large modulation, such as that caused by a gas bubble 21. If the stored limit value is exceeded, modulation is present; otherwise, it is not. The limit value can be estimated, for example, by empirical values and/or mathematical models, in particular vibration equations, and/or can be determined by appropriate tests.

If such a measurable modulation is found, it can be assumed that the object 2 is a gas bubble 21; see dash "y" after step D). If, on the other hand, no such modulation is found, a foreign body 22 is detected in the medium 1; see dash "n" after step D). Optionally, a comparison can also be made between the two curves of the permittivity epsilon (without excitation by ultrasonic waves USW) and the permittivity epsilon' (with excitation by ultrasonic waves USW). Then, for example, the message, "modulation present," is generated, in particular by the control/evaluation unit 5, and/or the message, "gas bubble 21 and no foreign body 22 present," is generated. If no modulation is found, a corresponding message, for example, is generated in the control/evaluation unit 5—for example, "no modulation present" and/or "foreign body 22 and no gas bubble 21 present."

In this way, the method according to the invention presents a safe way to distinguish gas bubbles 21 from foreign bodies 22 in a medium 1.

In the description of the figures, only the embodiment of the method according to the invention has been explained in which the received microwave signals MWE are evaluated twice—once with excitation by ultrasonic waves USW in step C), and once in a preceding step, without excitation by ultrasonic waves USW in step B).

In fact, step B) is not absolutely necessary in the context of the invention, because both the verification of the presence of the object 2 and the distinction between a gas bubble 21 and a foreign body 22 can be carried out solely on the basis of steps C) and D)—for example, on the basis of an analysis of the time curve shown in FIG. 2b and FIG. 2c. In FIG. 2b, it can be seen both that an object 2 is present (by the local minimum) and that the object 2 is a gas bubble 21 (by the modulation).

The method according to the invention has been further explained exclusively on the basis of the permittivity epsilon; as mentioned above, other values that can be derived from the received microwave signals MWE are also suitable, including the examples listed above, which are naturally comprised, mutatis mutandis, by the method according to the invention.

FIG. 3 again shows a measuring system according to the invention in more detail in one embodiment of the invention. Here, a portion of a pipeline 7 is shown through which the medium 1 flows—for example, a pipeline 7 in a food-processing filling plant.

A microwave transmitter unit 31 and a microwave receiver unit 32 are attached outside the pipeline 7 and are designed to transmit the transmitted microwave signals MWA into the medium 1 or to receive the received microwave signals MWE after passing through the medium 1. The microwave transmitter unit 31 and the microwave receiver unit 32 are connected to the control/evaluation unit 5 by means of a communications connection. As mentioned above, the system can also comprise a plurality of microwave transmitter units 31, 33 and microwave receiver units 32, 34, depending upon the embodiment.

Furthermore, the measuring system comprises an ultrasonic transmitter unit 41 and an ultrasonic receiver unit 42. In the event that the object 2 is a gas bubble 21, the gas bubble 21 is set into vibration by the ultrasonic waves USW, as a result of which, as mentioned above, the received microwave signals MWE or the permittivity epsilon' derived therefrom is/are modulated. In order to control the ultrasonic waves USW in such a way that the gas bubble 21 is excited into mechanical resonance, the measuring system comprises, for example, its own, second control/evaluation unit 6. Of course, the control in mechanical resonance can also be done by means of the first control/evaluation unit 5, so that the measuring system comprises only a single control/evaluation unit 5.

The control/evaluation units 5, 6 are, for example, a higher-level control unit, e.g., a process control system having a computer or a programmable logic controller (PLC), or else a transmitter unit of a microwave measuring device and/or a transmitter unit of an ultrasonic measuring device.

The communications connections are, for example, a wired communications connection, e.g., an analog measurement transmission path, in particular according to the 4-20 mA standard, or a wired fieldbus of automation technology—for example, Foundation Fieldbus, Profibus PA, Profibus DP, HART, CANBus. However, it can also be a communications connection of a modern industrial communications network, e.g., an "Industrial Ethernet" fieldbus, in particular Profinet, HART-IP or Ethernet/IP, or a communications network known from the communications sector—for example, Ethernet according to the TCP/IP protocol.

In the event that the communications connection is wireless, it can, for example, be a Bluetooth, ZigBee, WLAN, GSM, LTE, UMTS communications network or else a wireless version of a fieldbus, in particular 802.15.4-based standards such as WirelessHART.

The invention claimed is:

1. A method for distinguishing between a presence of a foreign body or a gas bubble in a flowable medium in a pipeline or a container, the method comprising:
    transmitting microwave signals into the flowable medium;
    introducing mechanical vibrations into the flowable medium;
    receiving microwave signals that have passed through the flowable medium;
    evaluating the received microwave signals and detecting the presence of an object the gas bubble, or the foreign body in the flowable medium via the received microwave signals or a value derived therefrom, wherein the gas bubble present in the flowable medium is set into vibration by the mechanical vibrations, and a modulation of the received microwave signals or of the value derived therefrom is generated by the vibrating gas bubble;
    detecting the gas bubble only when mechanical vibrations are introduced and the received microwave signals or the value derived therefrom is/are modulated; and
    otherwise, detecting a foreign body.

2. The method according to claim 1, wherein the value derived from the received microwave signals is a permittivity of the flowable medium.

3. The method according to claim 1, wherein the mechanical vibrations are introduced into the medium by introducing ultrasonic waves.

4. The method according to claim 1, further comprising the following steps that are carried out before the step of introducing the mechanical vibrations into the flowable medium:
    transmitting microwave signals into the medium;
    receiving microwave signals that have passed through the medium; and
    evaluating the received microwave signals, wherein the presence of the object is detected via the received microwave signals or the value derived therefrom.

5. The method according to claim 4, wherein the step of evaluating the received microwave signals and detecting the presence of the object in the flowable medium further comprises:
    determining a size of the object.

6. The method according to claim 5, further comprising:
    selecting an excitation frequency of the introduced mechanical vibrations as a function of the determined size of the object.

7. The method according to claim 6, further comprising:
    determining a resonance frequency based on the size of the object,
    wherein at the resonance frequency the gas bubble is set into resonant vibrations and the resonance frequency is selected as the excitation frequency.

8. A system for distinguishing between a presence of a foreign body or a gas bubble in a flowable medium in a pipeline or a container, comprising:
    at least one microwave transmitter unit designed to transmit microwave signals into the flowable medium;
    at least one microwave receiver unit designed to receive microwave signals that have passed through the flowable medium;
    an ultrasonic transmitter unit is designed to introduce ultrasonic waves into the flowable medium; and
    a control/evaluation unit configured to distinguish between the presence of the gas bubble or the foreign body in the medium on the basis of the evaluation of the received microwave signals or a value derived therefrom,
    wherein the gas bubble present in the flowable medium is set into vibration by the ultrasonic waves, and a modulation of the received microwave signals or of the value derived therefrom is generated by the vibrating gas bubble,
    wherein the gas bubble is detected only when the ultrasonic waves are introduced and the received microwave signals or the value derived therefrom is/are modulated.

* * * * *